US012757211B2

(12) United States Patent
Mu

(10) Patent No.: US 12,757,211 B2
(45) Date of Patent: Oct. 6, 2026

(54) RESOURCE SCHEDULING METHOD, APPARATUS, ACCESS NETWORK DEVICE, TERMINAL AND STORAGE MEDIUM

(71) Applicant: Beijing Xiaomi Mobile Software Co., Ltd., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 639 days.

(21) Appl. No.: 17/915,835

(22) PCT Filed: Apr. 2, 2020

(86) PCT No.: PCT/CN2020/083063
§ 371 (c)(1),
(2) Date: Sep. 29, 2022

(87) PCT Pub. No.: WO2021/196142
PCT Pub. Date: Oct. 7, 2021

(65) Prior Publication Data
US 2023/0156720 A1 May 18, 2023

(51) Int. Cl.
*H04W 72/23* (2023.01)
*H04W 72/1273* (2023.01)
*H04W 72/50* (2023.01)

(52) U.S. Cl.
CPC ....... *H04W 72/23* (2023.01); *H04W 72/1273* (2013.01); *H04W 72/535* (2023.01)

(58) Field of Classification Search
CPC ............. H04W 72/23; H04W 72/1273; H04W 72/535
USPC ....... 370/329, 328, 336, 330, 252, 280, 311, 370/341
See application file for complete search history.

(56) References Cited

U.S. PATENT DOCUMENTS

2012/0069778 A1 3/2012 Zhang et al.
2018/0049046 A1 2/2018 Lunttila et al.
2018/0205534 A1 7/2018 Yi
2019/0223199 A1* 7/2019 Park ...................... H04L 1/1861
2019/0223215 A1* 7/2019 Tian .................. H04W 72/0453
(Continued)

FOREIGN PATENT DOCUMENTS

CN 106506123 A 3/2017
CN 106533629 A 3/2017
(Continued)

OTHER PUBLICATIONS

Nokia Networks, R1-153824, Timing Relationship Considerations for MTC (Aug. 24-28, 2015).
(Continued)

*Primary Examiner* — Kwang B Yao
*Assistant Examiner* — Bradley D Lytle, Jr.
(74) *Attorney, Agent, or Firm* — Volpe Koenig

(57) ABSTRACT

A resource scheduling method, the method includes: determining a scheduling delay between a physical downlink shared channel and a physical downlink control channel, where the physical downlink shared channel and the physical downlink control channel correspond to at least two different possible scheduling delays; and transmitting the physical downlink control channel, and transmitting the physical downlink shared channel based on the scheduling delay.

20 Claims, 5 Drawing Sheets

(56) References Cited

U.S. PATENT DOCUMENTS

| | | | | |
|---|---|---|---|---|
| 2019/0230499 | A1* | 7/2019 | Sun | H04L 1/1887 |
| 2020/0275524 | A1* | 8/2020 | Wang | H04W 76/27 |
| 2021/0067281 | A1* | 3/2021 | Sarkis | H04L 1/1887 |
| 2021/0168847 | A1* | 6/2021 | Luo | H04L 1/1822 |
| 2021/0274536 | A1* | 9/2021 | Shin | H04W 72/535 |
| 2022/0231820 | A1* | 7/2022 | Zaki | H04L 5/0055 |

FOREIGN PATENT DOCUMENTS

| | | | |
|---|---|---|---|
| CN | 107046722 | A | 8/2017 |
| CN | 108270514 | A | 7/2018 |
| CN | 108541359 | A | 9/2018 |
| CN | 108604946 | A | 9/2018 |
| CN | 110149681 | A | 8/2019 |
| CN | 110536459 | A | 12/2019 |
| CN | 110800234 | A | 2/2020 |
| CN | 110856263 | A | 2/2020 |
| WO | 2019047948 | A1 | 3/2019 |

OTHER PUBLICATIONS

Ericsson, RP-151186, Status Report for Further LTE Physical Layer Enhancements for MTC (Sep. 14-16, 2015).
Qualcomm Incorporated et al., R1-1910735, “Increased peak data rate for HD-FDD MTC UEs” (2019).
MediaTek Inc., R1-1905733, “Summary Delay-tolerant re-transmission mechanisms in NR-NTN” (2019).
Ericsson, R2-1711177, “HARQ Configurations in NR” (2017).
Research on Optimization of Transmission Time Interval (TTI) Based on LTE-A Pro-Sun Xiaotong (2017).
Chinese Office Action issued on May 11, 2023 for Chinese Patent Application No. 202080000677.9.

* cited by examiner

RESOURCE SCHEDULING METHOD, APPARATUS, ACCESS NETWORK DEVICE, TERMINAL AND STORAGE MEDIUM

CROSS-REFERENCE TO RELATED APPLICATION

The present application is a U.S. National Stage of International Application No. PCT/CN2020/083063, filed on Apr. 2, 2020, the contents of all of which are incorporated herein by reference in their entireties for all purposes.

BACKGROUND

In recent years, the booming Internet of Things has brought convenience to life and work in various ways. Machine type communication (MTC) is a representative of the cellular Internet of Things technology. At present, MTC has been widely used in smart cities for meter reading, used in intelligent agriculture for collecting temperature, humidity and other information, and used in intelligent transportation for bike-sharing and numerous other fields.

SUMMARY

Examples of the disclosure provide a resource scheduling method and apparatus, an access network device, user equipment and a storage medium.

According to an aspect of the examples of the disclosure, there is provided a resource scheduling method. The method includes:

- determining a scheduling delay between a physical downlink shared channel and a physical downlink control channel, where the physical downlink shared channel and the physical downlink control channel correspond to at least two different possible scheduling delays; and
- transmitting the physical downlink control channel, and transmitting the physical downlink shared channel based on the scheduling delay.

According to another aspect of the examples of the disclosure, there is provided a resource scheduling method. The method includes:

- determining a scheduling delay between a physical downlink shared channel and a physical downlink control channel, where the physical downlink shared channel and the physical downlink control channel correspond to at least two different possible scheduling delays; and
- receiving the physical downlink control channel, and receiving the physical downlink shared channel based on the scheduling delay.

According to another aspect of the examples of the disclosure, there is provided an access network device. The access network device includes: a processor, and a memory configured to store an executable instruction for the processor, where the processor is configured to implement the resource scheduling method described above by loading and executing the executable instruction.

According to another aspect of the examples of the disclosure, there is provided user equipment. The user equipment includes: a processor, and a memory configured to store an executable instruction for the processor, where the processor is configured to implement the resource scheduling method described above by loading and executing the executable instruction.

According to another aspect of the examples of the disclosure, there is provided a computer-readable storage medium, where when an instruction in the computer-readable storage medium is executed by a processor, the resource scheduling method described above may be executed.

It should be understood that the above general description and the following detailed description are merely illustrative and explanatory, and cannot limit the disclosure.

BRIEF DESCRIPTION OF THE DRAWINGS

The accompanying drawings here, which are incorporated in the description as a constituent part of the description, illustrate examples conforming to the disclosure and are used to describe principles of the disclosure together with the description.

DETAILED DESCRIPTION

The examples will be described in detail here and shown in the accompanying drawings illustratively. When the following descriptions relate to the accompanying drawings, unless otherwise specified, the same numeral in different accompanying drawings denotes the same or similar element. The implementations described in the following examples do not denote all implementations consistent with the disclosure. On the contrary, the implementations are merely examples of an apparatus and a method consistent with some aspects of the disclosure as detailed in the appended claims.

The disclosure relates to the technical field of communications, and particularly relates to a resource scheduling method and apparatus, an access network device, user equipment and a storage medium.

Figure 1:
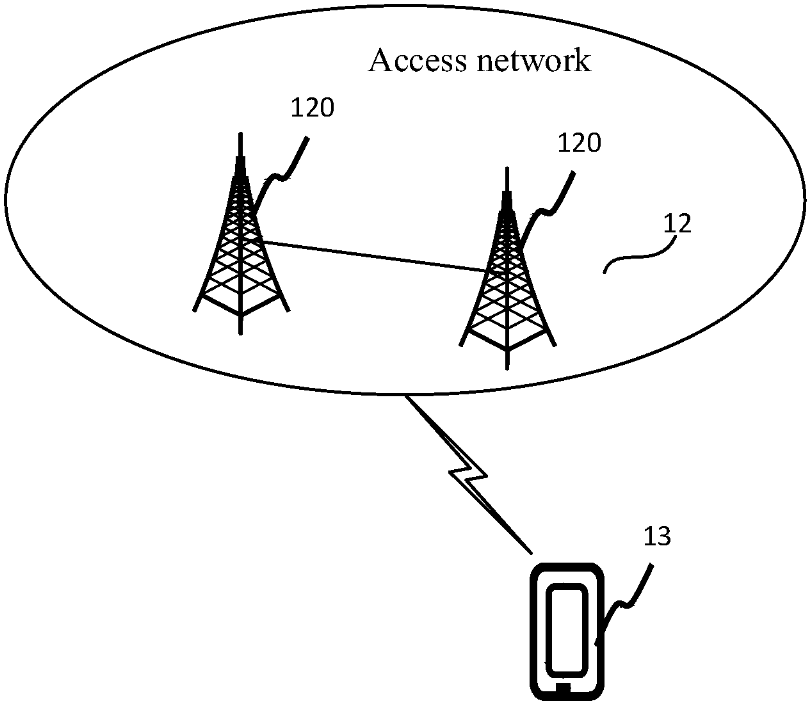
FIG. 1 shows a block diagram of a communication system provided in an example of the disclosure.

FIG. 1 shows a block diagram of a communication system provided in an example of the disclosure. As shown in FIG. 1, the communication system may include: an access network 12 and user equipment 13.

The access network 12 includes several access network devices 120. The access network devices 120 may be base stations. The base stations are apparatuses that are deployed in the access network and configured to provide a wireless communication function for the user equipment. The base stations may include various forms of macro sites, micro sites, relay stations, access points, etc. In systems using different wireless access technologies, devices having a base station function may have different names. In a 5th generation mobile communication technology (5G) new radio (NR) system, a device is called gNodeB or gNB. With evolution of communication technologies, descriptions of the name “base station” may be changed. For convenience of description, the above-described apparatuses for providing a wireless communication function for user equipment are collectively called access network devices below.

The user equipment 13 may include various handheld devices, vehicle-mounted devices, wearable devices or computing devices having a wireless communication function, or other processing devices connected to wireless modems, and various forms of user devices, mobile stations (MS), user equipment, etc. For convenience of description, the above-described devices are collectively called user equipment. The access network device 120 is in communication with the user equipment 13 through some radio technology, such as a Uu interface.

A half duplex frequency division duplexing (HD-FDD) machine type communication (MTC) user equipment is a half duplex MTC user equipment. The half duplex here indicates that at a certain moment, the user equipment may merely transmit or receive data.

The MTC user equipment follows a relatively simple scheduling delay. As shown in Table 1, assuming that a MTC physical downlink control channel (MPDCCH) is transmitted on subframe n, a MTC physical downlink shared channel (MPDSCH) may be transmitted on subframe n+2. For example, C1 in the MPDCCH is transmitted on subframe 0, and D1 in the corresponding MPDSCH is transmitted on subframe 2.

TABLE 1

| Subframe | 0 | 1 | 2 | 3 | 4 | 5 | 6 | 7 | 8 | 9 | 10 | 11 |
|---|---|---|---|---|---|---|---|---|---|---|---|---|
| MPDCCH | C1 | C2 | C3 | | | | | | C4 | C5 | | |
| MPDSCH | | | D1 | D2 | D3 | | | | | | D4 | D5 |
| HARQ feedback | | | | | | | HARQ | | | | | |

For HD-FDD MTC, when the user equipment needs to conduct hybrid automatic repeat request (HARQ) feedback, with reference to Table 1, the user equipment switches from downlink to uplink, with a switching delay of 1 ms (corresponding to subframe 5 in Table 1), and meanwhile transmits the HARQ feedback, with at least 1 ms (corresponding to subframe 6 in Table 1), and the user equipment switches from uplink to downlink after transmission is completed, with a switching delay of 1 ms (corresponding to subframe 7 in Table 1). In addition, the MPDSCH cannot be received in 3 ms, and a scheduling delay between the MPDCCH and the MPDSCH is 2 ms, such that the MPDCCH cannot be transmitted in two subframes (corresponding to subframes 3 and 4 in Table 1) before the user equipment conducts the HARQ feedback, that is, transmission of the MPDCCH needs to be interrupted 2 ms in advance. Thus, the single fixed scheduling delay is not conducive to resource scheduling. As in an example in Table 1, the whole transmission may be interrupted for at least 5 ms, such that active time of the user equipment may be lengthened, which is not conducive to the power saving of the user equipment and improvement of a transmission rate.

The communication system and service cases described in the examples of the disclosure are intended to describe the technical solution of the examples of the disclosure more clearly, instead of limiting the technical solution provided in the examples of the disclosure. As those of ordinary skill in the art know, with evolution of the communication system and emergence of new service cases, the technical solution provided in the examples of the disclosure is also applicable to similar technical problems.

Figure 2:
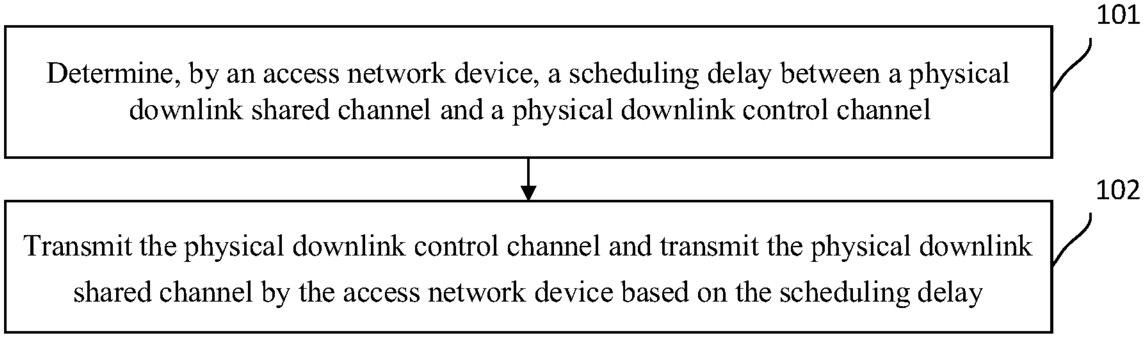
FIG. 2 is a flow diagram of a resource scheduling method according to an example.

FIG. 2 is a flow diagram of a resource scheduling method according to an example. With reference to FIG. 2, the method includes the following steps.

In step 101, an access network device determines a scheduling delay between a physical downlink shared channel and a physical downlink control channel.

In the example of the disclosure, the physical downlink shared channel and the physical downlink control channel correspond to at least two different possible scheduling delays. The possible scheduling delays here indicate scheduling delays that may be selected. The scheduling delays that may be selected may be preset scheduling delays or scheduling delays that are computed in real time. In different cases, the access network device may select different scheduling delays for resource scheduling, such that a resource scheduling solution may be improved, the transmission rate may be increased, and total power consumption of the user equipment may be reduced.

In step 102, the access network device transmits the physical downlink control channel, and transmits the physical downlink shared channel based on the scheduling delay.

In the example of the disclosure, the access network device determines the scheduling delay between the physical downlink shared channel and the physical downlink control channel, and then the scheduling delay is used for transmitting a downlink channel. Because the scheduling delay is selected and configured from at least two different possible scheduling delays, different scheduling delays may be determined in different cases, such that resource scheduling is made more flexible, and the resource scheduling is improved.

In the example of the disclosure, the scheduling delay between the physical downlink shared channel and the physical downlink control channel may be determined in any one of the following ways.

One of a plurality of possible scheduling delays is determined according to a protocol, for example, according to different cases, different channel conditions, different service types, or any other factors.

One of a plurality of possible scheduling delays is determined through negotiation between the user equipment and a network side (the access network device), for example, the user equipment recommends one of the plurality of possible scheduling delays to the network side, and alternatively, any other user equipment may negotiate with the network side. In some examples, both the user equipment and the network side have same configuration information of possible scheduling delays, and the user equipment reports a recommendation to use one of the possible scheduling delays to the network side. During reporting, an identifier of the possible scheduling delays or a parameter value of the possible scheduling delays may be reported. In some examples, merely the user equipment is configured with the configuration information of possible scheduling delays, and the user equipment transmits a parameter value of a recommended scheduling delay to the network side.

The network side configures the user equipment via an instruction, for example, the network side notifies the user equipment side of using one of the plurality of possible scheduling delays via a downlink control instruction or any appropriate signaling. In some examples, both the user equipment and the network side have the same configuration information of possible scheduling delays, and the network side instructs the user equipment to use one of the possible scheduling delays via signaling.

The network side configures a parameter value of the scheduling delay for the user equipment via an instruction, for example, the network side notifies the user equipment side of using a scheduling delay via downlink control signaling or any appropriate signaling, the scheduling delay being one of the plurality of possible scheduling delays. In some examples, merely the network side is configured with the configuration information of possible scheduling delays, and the network side directly transmits the parameter value of the scheduling delay to the user equipment via signaling.

Optionally, the step that a scheduling delay between a physical downlink shared channel and a physical downlink control channel is determined includes:

the scheduling delay is determined according to a correspondence between the number of unavailable subframes and the possible scheduling delays. The unavailable subframes are subframes that do not transmit a downlink channel.

For example, as shown in Table 2, the unavailable subframes are subframes 5, 6 and 7, and the number of the unavailable subframes is 3. In view of this, the scheduling delay is determined to be 5 ms. As shown in Table 2, there is 5 ms between C4 and D4 and 5 ms between C5 and D5. After the scheduling delay is determined to be 5 ms, compared with scheduling delay configuration in Table 1, the MPDCCH may be transmitted on subframes 3 and 4, such that overall transmission time may be shortened, the transmission rate may be increased, and power consumption of the user equipment may be reduced.

TABLE 2

| Subframe | 0 | 1 | 2 | 3 | 4 | 5 | 6 | 7 | 8 | 9 | 10 | 11 |
|---|---|---|---|---|---|---|---|---|---|---|---|---|
| MPDCCH | C1 | C2 | C3 | C4 | C5 | | | | | | | |
| MPDSCH | | | D1 | D2 | D3 | | | | D4 | D5 | | |
| HARQ feedback | | | | | | | HARQ | | | | | |

It should be noted that, in the case shown in Table 2, when the access network device transmits the HARQ feedback, the scheduling delay is switched, that is, the scheduling delay is switched from 2 ms to 5 ms.

With reference to Table 2, after the MPDCCH is transmitted, in response to determining that the subframe 2 is an available subframe, an original scheduling delay is used, for example, the MPDCCH is transmitted on the subframe 0, and the MPDSCH is transmitted on the subframe 2. After the MPDCCH is transmitted, in response to determining that the subframe 2 is an unavailable subframe, the corresponding MPDSCH is delayed to be transmitted on a first available subframe of a user.

In all the examples of the disclosure, the correspondence between the number of unavailable subframes and the possible scheduling delays may be determined in any one of the following ways.

The network side or user equipment determines the correspondence between the number of unavailable subframes and the possible scheduling delays according to a protocol.

The network side or user equipment determines the correspondence between the number of unavailable subframes and the possible scheduling delays through negotiation between the user equipment and the network side.

The network side configures the user equipment via an instruction, such that the user equipment obtains the correspondence.

In all the examples of the disclosure, after the network side and user equipment determine the correspondence between the number of unavailable subframes and the possible scheduling delays, which correspondence between the number of unavailable subframes and the possible scheduling delays is used may be determined in any one of the above-described ways, that is, one of the plurality of possible scheduling delays may be determined according to a protocol; and alternatively, one of a plurality of scheduling delays may be determined through negotiation between the user equipment and the network side.

The instruction may be transmitted via high signaling. In the example of the disclosure, the high signaling may be radio resource control (RRC) high signaling.

Optionally, the unavailable subframes include at least one of the following:

a switching subframe between uplink transmission and downlink transmission, and a subframe for transmitting hybrid automatic repeat request feedback.

With reference to Table 2 again, subframes 5 and 7 are switching subframes between uplink transmission and downlink transmission, and subframe 6 is a subframe for transmitting hybrid automatic repeat request feedback.

In the example of the disclosure, the access network device may notify the user equipment which subframes are unavailable subframes. A notification way may be realized by high signaling. The high signaling here may be RRC high signaling.

Optionally, the step that a scheduling delay between a physical downlink shared channel and a physical downlink control channel is determined includes:

the scheduling delay is determined according to a correspondence between a HARQ process number and the possible scheduling delays.

For example, as shown in Table 3, a possible scheduling delay corresponding to hybrid automatic repeat request process numbers 1-8 is 2 ms, and a possible scheduling delay corresponding to hybrid automatic repeat request process numbers 9-14 is 5 ms.

TABLE 3

| HARQ process number | Scheduling delay |
|---|---|
| 1~8 | 2 |
| 9~14 | 5 |

For another example, as shown in Table 4, a scheduling delay corresponding to hybrid automatic repeat request process numbers 1-8 is 2 ms, and a scheduling delay corresponding to hybrid automatic repeat request process numbers 9-14 is N ms. N may be determined according to whether there are unavailable subframes and the number of unavailable subframes. For example, transmission of the HARQ feedback takes up 3 subframes, and in addition, switching delays between uplink and downlink on two sides are both 1 s, such that the scheduling delay here is 5 ms.

TABLE 4

| HARQ process number | Scheduling delay |
|---|---|
| 1~8 | 2 |
| 9~14 | N |

Optionally, different hybrid automatic repeat request process numbers correspond to same or different possible scheduling delays.

With reference to Table 3, a possible scheduling delay corresponding to hybrid automatic repeat request process numbers 1-8 is 2 ms, and a scheduling delay corresponding to hybrid automatic repeat request process numbers 1-8 is N ms, that is, the hybrid automatic repeat request process numbers correspond to a plurality of possible scheduling delays.

In response to determining that the hybrid automatic repeat request process numbers correspond to the plurality of possible scheduling delays, different scheduling delays in the plurality of possible scheduling delays may be used in different cases.

In the implementation, in response to determining that the hybrid automatic repeat request process numbers correspond to the plurality of possible scheduling delays, the scheduling delay may be adjusted in different cases, for example, from 2 ms to 5 ms, so as to be conducive to resource scheduling.

Optionally, the different cases include the different numbers of unavailable subframes.

In the implementation, in response to determining that the number of unavailable subframes is different, the corresponding scheduling delay may be set to be different. For example, the number of unavailable subframes is 3 in the case shown in Table 2. In this case, the scheduling delay may be 5 ms. In response to determining that the number of unavailable subframes is 4 in other cases, the scheduling delay may be 6 ms. The scheduling delay may be determined on the basis of the number of unavailable subframes, such that the scheduling delay is more suitable for a current case, the overall transmission time is shortened, the transmission rate is increased, and the power consumption of the user equipment is reduced.

Optionally, different hybrid automatic repeat request process numbers correspond to same or different possible scheduling delays. For example, as shown in Table 3, hybrid automatic repeat request process numbers 1 and 8 correspond to same possible scheduling delays, and hybrid automatic repeat request process numbers 8 and 9 correspond to different possible scheduling delays.

Optionally, different hybrid automatic repeat request process numbers are grouped, and different groups of hybrid automatic repeat request process numbers correspond to different possible scheduling delays. For example, as shown in Table 3, hybrid automatic repeat request process numbers 1-8 form a group, hybrid automatic repeat request process numbers 9-14 form a group, and the two groups correspond to different possible scheduling delays. Certainly, the correspondences between the hybrid automatic repeat request process number and the possible scheduling delays in Table 3 and Table 4 are merely examples. In other implementations, the scheduling delays may be other values, and alternatively, hybrid automatic repeat request process numbers may be divided into more groups, and even each group of hybrid automatic repeat request process numbers corresponds to more scheduling delays.

In all the examples of the disclosure, the correspondence between the hybrid automatic repeat request process number and the possible scheduling delays may be determined in any one of the following ways:

the network side or user equipment determines the correspondence between the hybrid automatic repeat request process number and the possible scheduling delays according to a protocol.

The network side or user equipment determines the correspondence between the hybrid automatic repeat request process number and the possible scheduling delays through negotiation between the user equipment and the network side.

The network side configures the user equipment via an instruction, such that the user equipment obtains the correspondence.

Optionally, the method further includes:

the scheduling delay between the physical downlink shared channel and the physical downlink control channel is determined in response to reaching a triggering condition.

In the implementation, the scheduling delay is determined according to the solution provided in the disclosure only in response to determining that a transmission environment reaches the triggering condition. In other transmission environments, a fixed scheduling delay, such as 2 ms, may be used. The design makes a system design more flexible and takes into account operation of devices that cannot flexibly determine the scheduling delay, such that the devices that may merely use fixed scheduling delays may also operate normally.

Optionally, the triggering condition includes:

the number of continuously scheduled hybrid automatic repeat request processes exceeds a threshold.

In MTC, there may be a plurality of parallel hybrid automatic repeat request processes. In response to determining that the number of existing hybrid automatic repeat request processes exceeds the threshold, a flexible scheduling solution provided in the disclosure is used.

Here, the number of continuously scheduled hybrid automatic repeat request processes is the amount of scheduling information continuously transmitted from the access network device and the amount of scheduling information continuously received by the user equipment.

Optionally, the triggering condition includes:

the user equipment has a capability to configure the scheduling delay.

As described above, when the system is designed, support of the user equipment for the function needs to be considered. Only in response to determining that the user equipment supports the function, a scheduling delay between the access network device and the user equipment is determined according to the above-described solution for transmission.

Optionally, the method further includes:

first signaling is received.

The first signaling is configured to indicate that the user equipment has the capability to configure the scheduling delay; alternatively, the first signaling includes an identifier for indicating that the user equipment has the capability to configure the scheduling delay; alternatively, the first signaling is configured to indicate that the user equipment supports a preset feature; and alternatively, the first signaling includes an identifier for indicating that the user equipment supports a preset feature.

In the example of the disclosure, the user equipment may make the access network device know whether the user equipment may support flexible configuration of the scheduling delay by reporting a capability of the user equipment, that is, the above-described first signaling.

The first signaling may be transmitted by limiting user equipment (UE) capability information in the description, and the information may be transmitted via any suitable signaling, such as the RRC high signaling.

As described above, the first signaling may indicate whether the user equipment supports the flexible configuration of the scheduling delay in various ways. For example, in the first signaling, 1 and 0 are configured to indicate that the flexible configuration of the scheduling delay is supported or not respectively, such that the access network device may directly determine whether the scheduling delay may be determined through the solution of the disclosure. For another example, in response to determining that the user equipment reports that the user equipment supports a certain feature, the access network device considers that the user equipment supports a flexible scheduling delay. For example, the flexible scheduling delay is associated with support for a 14 HARQ process. In response to determining that the first signaling includes the support for the 14 HARQ process, the access network device considers that the user equipment supports the flexible configuration of the scheduling delay.

It is worth noting that the above-described steps 101-102 and the above-described optional steps may be arbitrarily combined.

Figure 3:
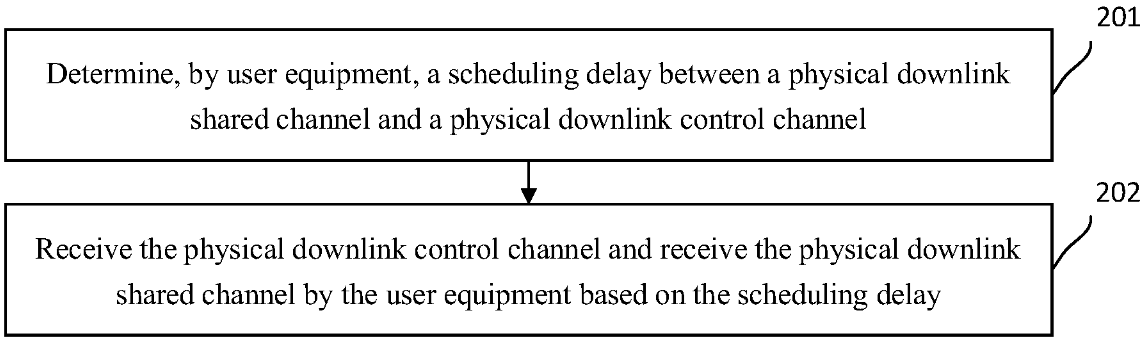
FIG. 3 is a flow diagram of a resource scheduling method according to an example.

FIG. 3 is a flow diagram of a resource scheduling method according to an example. With reference to FIG. 3, the method includes the following steps.

In step 201, user equipment determines a scheduling delay between a physical downlink shared channel and a physical downlink control channel.

In the example of the disclosure, the physical downlink shared channel and the physical downlink control channel correspond to at least two different possible scheduling delays. In different cases, the user equipment may select different scheduling delays for resource scheduling, such that a resource scheduling solution may be improved, a transmission rate may be increased, and total power consumption of the user equipment may be reduced.

In step 202, the user equipment receives the physical downlink control channel, and receives the physical downlink shared channel based on the scheduling delay.

In the example of the disclosure, the user equipment determines the scheduling delay between the physical downlink shared channel and the physical downlink control channel, and then the scheduling delay is used for transmitting a downlink channel. Because the scheduling delay is selected and configured from at least two different possible scheduling delays, different scheduling delays may be determined in different cases, such that resource scheduling is made more flexible, and the resource scheduling is improved.

Optionally, the step that a scheduling delay between a physical downlink shared channel and a physical downlink control channel is determined includes:

the scheduling delay is determined according to a correspondence between the number of unavailable subframes and the possible scheduling delays. The unavailable subframes are subframes that do not transmit a downlink channel.

Optionally, the unavailable subframes include at least one of the following:

a switching subframe between uplink transmission and downlink transmission, and a subframe for transmitting hybrid automatic repeat request feedback.

In the example of the disclosure, the user equipment may receive a notification of which subframes are unavailable subframes from the access network device. A notification way may be realized by high signaling. Here, the high signaling may be RRC high signaling.

For example, time occupied by HARQ feedback is notified by the access network device, such as occupied subframes. Based on this, the user equipment may determine the number of unavailable subframes.

Optionally, the step that a scheduling delay between a physical downlink shared channel and a physical downlink control channel is determined includes:

the scheduling delay is determined according to a correspondence between one hybrid automatic repeat request process number and the possible scheduling delays.

Optionally, different hybrid automatic repeat request process numbers correspond to same or different possible scheduling delays.

Optionally, different hybrid automatic repeat request process numbers correspond to same or different possible scheduling delays.

Optionally, different hybrid automatic repeat request process numbers are grouped, and different groups of hybrid automatic repeat request process numbers correspond to different possible scheduling delays.

In all the examples of the disclosure, the correspondence between the hybrid automatic repeat request process number and the possible scheduling delays may be determined in any one of the following ways:

a network side or user equipment determines the correspondence between the hybrid automatic repeat request process number and the possible scheduling delays according to a protocol.

The network side or user equipment determines the correspondence between the hybrid automatic repeat request process number and the possible scheduling delays through negotiation between the user equipment and the network side.

The network side configures the user equipment via an instruction, such that the user equipment obtains the correspondence.

Optionally, the method further includes:

whether a current transmission environment reaches a triggering condition is determined.

The scheduling delay between the physical downlink shared channel and the physical downlink control channel is determined in response to reaching the triggering condition.

Optionally, the triggering condition includes:

the number of continuously scheduled hybrid automatic repeat request processes exceeds a threshold.

Optionally, the triggering condition includes:

the user equipment has a capability to configure the scheduling delay.

Optionally, the method further includes:

first signaling is transmitted.

The first signaling is configured to indicate that the user equipment has the capability to configure the scheduling delay; alternatively, the first signaling includes an identifier for indicating that the user equipment has the capability to configure the scheduling delay; alternatively, the first signaling is configured to indicate that the user equipment supports a preset feature; and alternatively, the first signaling includes an identifier for indicating that the user equipment supports a preset feature.

It is worth noting that the above-described steps 201-202 and the above-described optional steps may be arbitrarily combined.

Figure 4:
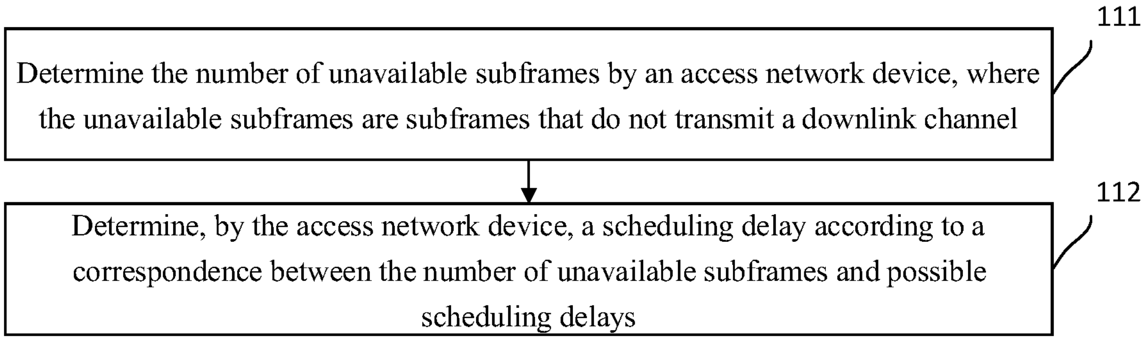
FIG. 4 is a flow diagram of a scheduling delay determination method according to an example.

It may be seen from FIGS. 2 and 3 that while the access network device and the user equipment conduct resource scheduling, the step that a scheduling delay between a physical downlink shared channel and a physical downlink control channel is determined is basically the same. With the access network device as an example, a solution for determining a scheduling delay by user equipment and the access network device provided in the example of the disclosure will be described as follows:

FIG. 4 is a flow diagram of a scheduling delay determination method according to an example. With reference to FIG. 4, step 101 of FIG. 2 includes:

Step 111, the access network device determines the number of unavailable subframes. The unavailable subframes are subframes that do not transmit a downlink channel.

Optionally, the unavailable subframes include at least one of the following:

a switching subframe between uplink transmission and downlink transmission, and a subframe for transmitting hybrid automatic repeat request feedback.

With reference to Table 2 again, subframes 5 and 7 are switching subframes between uplink transmission and downlink transmission, and subframe 6 is a subframe for transmitting hybrid automatic repeat request feedback.

Step 112, the access network device determines the scheduling delay according to a correspondence between the number of unavailable subframes and possible scheduling delays.

For example, the correspondence between the number of unavailable subframes and the possible scheduling delays may include a correspondence that in response to determining that the number of unavailable subframes is 0, the scheduling delay is 2 ms; and the correspondence between the number of unavailable subframes and the possible scheduling delays may include a correspondence that in response to determining that the number of unavailable subframes is 3, the scheduling delay is 5 ms, etc.

For example, as shown in Table 2, the unavailable subframes are subframes 5, 6 and 7, and the number of the unavailable subframes is 3. In view of this, the scheduling delay is determined to be 5 ms. As shown in Table 2, there is 5 ms between C4 and D4 and 5 ms between C5 and D5. After the scheduling delay is determined to be 5 ms, compared with scheduling delay configuration in Table 1, MPDCCH may be transmitted on subframes 3 and 4, such that overall transmission time may be shortened, a transmission rate may be increased, and power consumption of the user equipment may be reduced.

In all the examples of the disclosure, the correspondence between the number of unavailable subframes and the possible scheduling delays may be determined in any one of the following ways:

the network side or user equipment determines the correspondence between the number of unavailable subframes and the possible scheduling delays according to a protocol.

The network side or user equipment determines the correspondence between the number of unavailable subframes and the possible scheduling delays through negotiation between the user equipment and the network side.

The network side configures the user equipment via an instruction, such that the user equipment obtains the correspondence.

In all the examples of the disclosure, after the network side and user equipment determine the correspondence between the number of unavailable subframes and the possible scheduling delays, which correspondence between the number of unavailable subframes and the possible scheduling delays is used may be determined in any one of the above-described ways, that is, one of the plurality of possible scheduling delays may be determined according to a protocol; and alternatively, one of a plurality of scheduling delays may be determined through negotiation between the user equipment and the network side.

The instruction may be transmitted via high signaling. In the example of the disclosure, the high signaling may be RRC high signaling.

Figure 5:
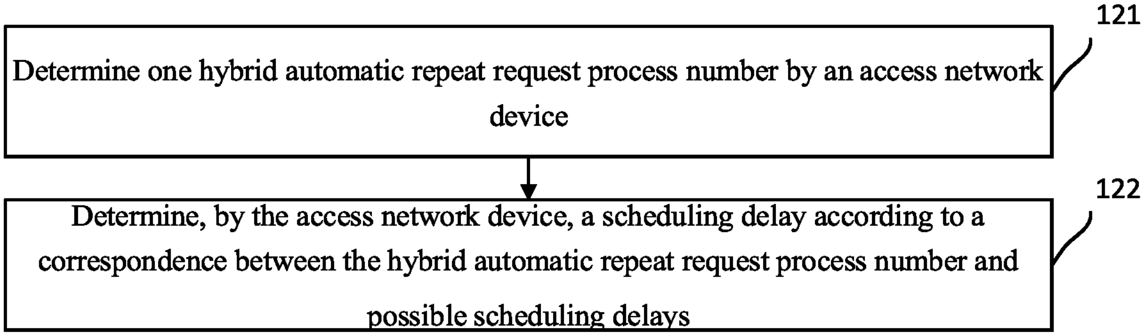
FIG. 5 is a flow diagram of a scheduling delay determination method according to an example.

FIG. 5 is a flow diagram of a scheduling delay determination method according to an example. With reference to FIG. 5, step 101, of FIG. 2 includes:

Step 121, the access network device determines one hybrid automatic repeat request process number.

In the example of the disclosure, the access network device may carry the hybrid automatic repeat request process number in a downlink control channel transmitted to the user equipment. In this way, the access network device may naturally determine the hybrid automatic repeat request process number, and the user equipment merely needs to obtain the hybrid automatic repeat request process number from the downlink control channel.

Step 122, the access network device determines the scheduling delay according to a correspondence between the hybrid automatic repeat request process number and the possible scheduling delays.

For example, as shown in Table 3, a possible scheduling delay corresponding to hybrid automatic repeat request process numbers 1-8 is 2 ms, and a possible scheduling delay corresponding to hybrid automatic repeat request process numbers 9-14 is 5 ms.

For example, different hybrid automatic repeat request process numbers correspond to same or different possible scheduling delays.

With reference to Table 3, a possible scheduling delay corresponding to hybrid automatic repeat request process numbers 1-8 is 2 ms, and a scheduling delay corresponding to hybrid automatic repeat request process numbers 1-8 is N ms, that is, the hybrid automatic repeat request process numbers correspond to a plurality of possible scheduling delays.

In response to determining that the hybrid automatic repeat request process numbers correspond to the plurality of possible scheduling delays, different scheduling delays in the plurality of possible scheduling delays may be used in different cases.

In the implementation, in response to determining that the hybrid automatic repeat request process numbers correspond to the plurality of possible scheduling delays, the scheduling delay may be adjusted in different cases, for example, from 2 ms to 5 ms, so as to be conducive to resource scheduling.

Optionally, the different cases include the different numbers of unavailable subframes.

In the implementation, in response to determining that the number of unavailable subframes is different, the corresponding scheduling delay may be set to be different. For example, the number of unavailable subframes is 3 in the case shown in Table 2. In this case, the scheduling delay may be 5 ms. In response to determining that the number of unavailable subframes is 4 in other cases, the scheduling delay may be 6 ms. The scheduling delay may be determined on the basis of the number of unavailable subframes, such that the scheduling delay is more suitable for a current case, the overall transmission time is shortened, the transmission rate is increased, and the power consumption of the user equipment is reduced.

Optionally, different hybrid automatic repeat request process numbers correspond to same or different possible scheduling delays. For example, as shown in Table 3, hybrid automatic repeat request process numbers 1 and 8 correspond to same possible scheduling delays, and hybrid automatic repeat request process numbers 8 and 9 correspond to different possible scheduling delays.

Optionally, different hybrid automatic repeat request process numbers are grouped, and different groups of hybrid automatic repeat request process numbers correspond to different possible scheduling delays. For example, as shown in Table 3, hybrid automatic repeat request process numbers 1-8 form a group, hybrid automatic repeat request process numbers 9-14 form a group, and the two groups correspond to different possible scheduling delays. Certainly, the correspondences between the hybrid automatic repeat request process number and the possible scheduling delays in Table 3 and Table 4 are merely examples. In other implementations, the scheduling delays may be other values, and alternatively, hybrid automatic repeat request process numbers may be divided into more groups, and even each group of hybrid automatic repeat request process numbers corresponds to more scheduling delays.

In all the examples of the disclosure, the correspondence between the hybrid automatic repeat request process number and the possible scheduling delays may be determined in any one of the following ways:

the network side or user equipment determines the correspondence between the hybrid automatic repeat request process number and the possible scheduling delays according to a protocol.

The network side or user equipment determines the correspondence between the hybrid automatic repeat request process number and the possible scheduling delays through negotiation between the user equipment and the network side.

The network side configures the user equipment via an instruction, such that the user equipment obtains the correspondence.

Figure 6:
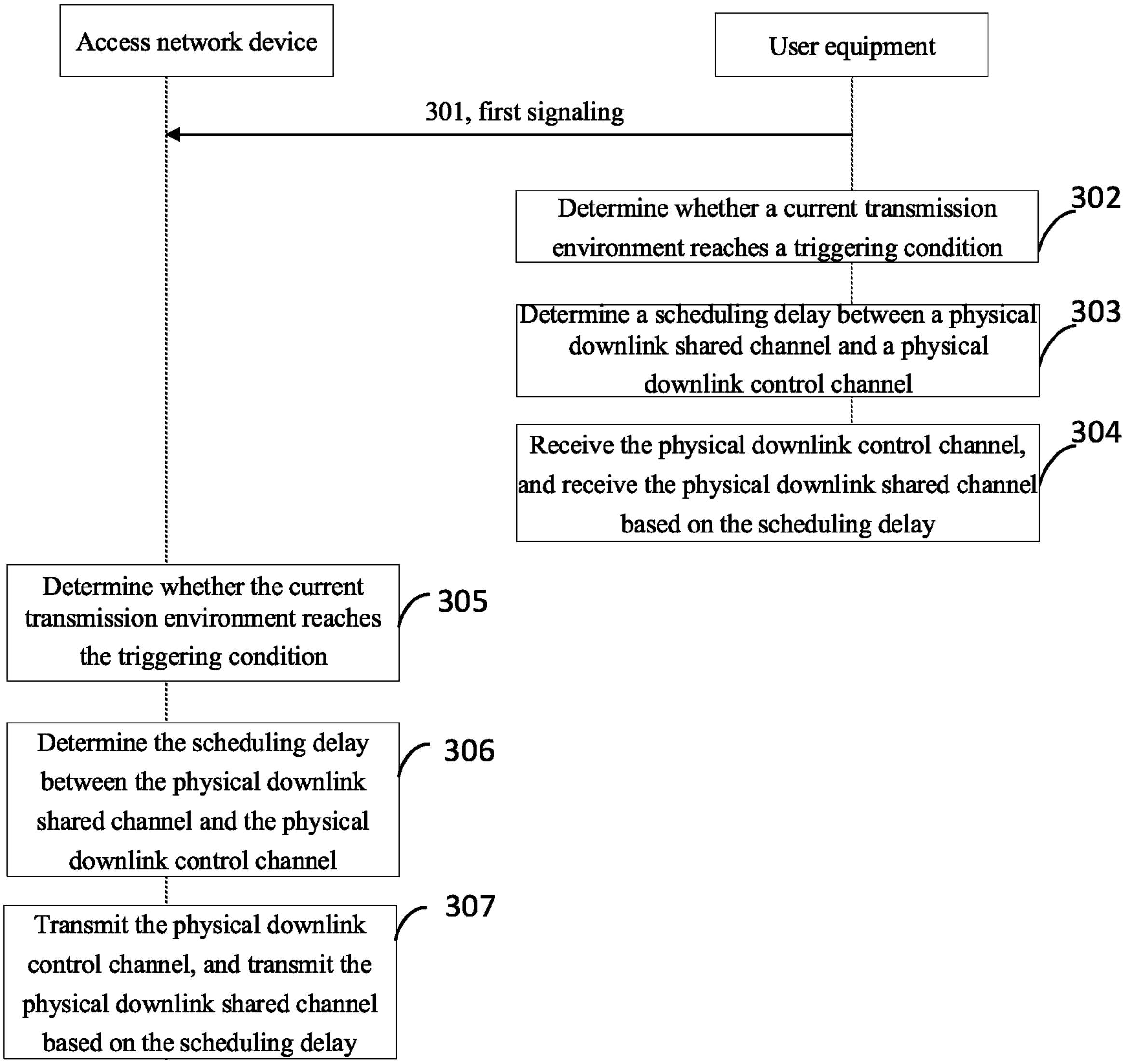
FIG. 6 is a flow diagram of a resource scheduling method according to an example.

FIG. 6 is a flow diagram of a resource scheduling method according to an example. With reference to FIG. 6, the method includes the following steps:

Step 301, the user equipment transmits first signaling; and the access network device receives the first signaling.

In the example of the disclosure, the user equipment may make the access network device know whether the user equipment may support flexible configuration of the scheduling delay by reporting a capability of the user equipment, that is, the above-described first signaling. The first signaling is configured to indicate that the user equipment has the capability to configure the scheduling delay; alternatively, the first signaling includes an identifier for indicating that the user equipment has the capability to configure the scheduling delay; alternatively, the first signaling is configured to indicate that the user equipment supports a preset feature; and alternatively, the first signaling includes an identifier for indicating that the user equipment supports a preset feature.

The first signaling may be transmitted by limiting user equipment capability information in the description, and the information may be transmitted via any suitable signaling, such as the RRC high signaling.

As described above, the first signaling may indicate whether the user equipment supports the flexible configuration of the scheduling delay in various ways. For example, in the first signaling, 1 and 0 are configured to indicate that the flexible configuration of the scheduling delay is supported or not respectively, such that the access network device may directly determine whether the scheduling delay may be determined through the solution of the disclosure. For another example, in response to determining that the user equipment reports that the user equipment supports a certain feature, the access network device considers that the user equipment supports a flexible scheduling delay. For example, the flexible scheduling delay is associated with support for a 14 HARQ process. In response to determining that the first signaling includes the support for the 14 HARQ process, the access network device considers that the user equipment supports the flexible configuration of the scheduling delay.

Step 302, the user equipment determines whether a current transmission environment reaches the triggering condition.

For example, the triggering condition includes: the number of continuously scheduled hybrid automatic repeat request processes exceeds a threshold.

In MTC, there may be a plurality of parallel hybrid automatic repeat request processes. In response to determining that the number of existing hybrid automatic repeat request processes exceeds the threshold, a flexible scheduling solution provided in the disclosure is used.

For example, the triggering condition includes: the user equipment has the capability to configure the scheduling delay.

As described above, when the system is designed, support of the user equipment for the function needs to be considered. Only in response to determining that the user equipment supports the function, a scheduling delay between the access network device and the user equipment is determined according to the above-described solution for transmission.

In the example of the disclosure, the triggering condition may be one or two of the above-described examples. The number of continuously scheduled hybrid automatic repeat request processes may be obtained via the PDCCH transmitted from the access network device to the user equipment, and whether the user equipment supports the flexible configuration of the scheduling delay may be obtained according to own information of the user equipment.

Step 303: in response to determining that the triggering condition is reached, the user equipment determines the scheduling delay between the physical downlink shared channel and the physical downlink control channel.

In the example of the disclosure, the physical downlink shared channel and the physical downlink control channel correspond to at least two different possible scheduling delays.

In the implementation, the user equipment may determine whether the triggering condition is reached after obtaining information such as the number of continuously scheduled hybrid automatic repeat request processes and whether the user equipment supports the flexible configuration of the scheduling delay.

It should be noted that there is no sequential relation between steps 302-303 and step 301.

In response to determining that the above-described triggering condition is not reached, the user equipment may use a fixed scheduling delay (for example, 2 ms) for resource scheduling.

A detailed process of step 303 may refer to steps 111-112 or steps 121-122 of FIG. 4 or FIG. 5, respectively.

Step 304, the user equipment receives the physical downlink control channel, and receives the physical downlink shared channel based on the scheduling delay.

With reference to Table 2, for example, when the scheduling delay is determined to be 5 ms, the user equipment receives C4 of the MPDCCH on subframe 3, and then receives D4 of the MPDSCH on subframe 8; and the user equipment receives C5 of the MPDCCH on subframe 4, and then receives D5 of the MPDSCH on subframe 9. That is, the user equipment delays for time corresponding to the scheduling delay and receives the physical downlink shared channel after receiving the physical downlink control channel.

Step 305, the access network device determines whether the current transmission environment reaches the triggering condition.

The solution of determining whether the triggering condition is reached by the access network device is the same as that of the user equipment, so a detailed process may refer to step 302.

Step 306, in response to determining that the triggering condition is reached, the access network device determines the scheduling delay between the physical downlink shared channel and the physical downlink control channel.

A detailed process of step 306 may refer to step 303.

It should be noted that there is no sequential relation between steps 305-306 and steps 302-303.

Step 307, the access network device transmits the physical downlink control channel, and transmits the physical downlink shared channel based on the scheduling delay A detailed process of step 307 may refer to step 304.

Figure 7:
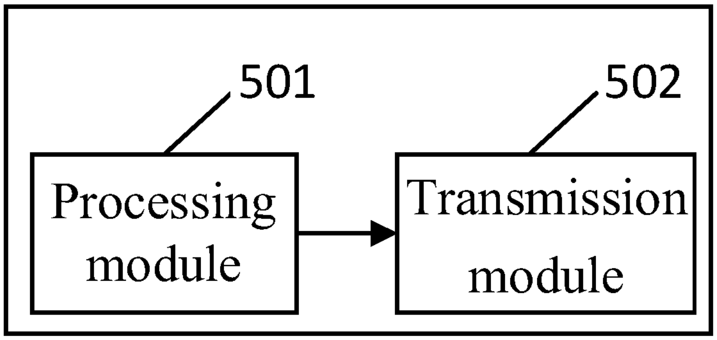
FIG. 7 is a structural schematic diagram of a resource scheduling apparatus according to an example.

FIG. 7 is a structural schematic diagram of a resource scheduling apparatus according to an example. The apparatus has a function of realizing an access network device in the above-described method example, and the function may be realized by hardware or by executing corresponding software by hardware. As shown in FIG. 7, the apparatus includes: a processing module 501 and a transmission module 502.

The processing module 501 is configured to determine a scheduling delay between a physical downlink shared channel and a physical downlink control channel. The physical downlink shared channel and the physical downlink control channel correspond to at least two different possible scheduling delays.

The transmission module 502 is configured to transmit the physical downlink control channel, and to transmit the physical downlink shared channel based on the scheduling delay Optionally, the processing module 501 is configured to determine the scheduling delay according to a correspondence between the number of unavailable subframes and the possible scheduling delays. The unavailable subframes are subframes that do not transmit a downlink channel.

Optionally, the unavailable subframes include at least one of the following:

- a switching subframe between uplink transmission and downlink transmission, and a subframe for transmitting hybrid automatic repeat request feedback.

Optionally, the processing module 501 is configured to determine the scheduling delay according to a correspondence between one hybrid automatic repeat request process number and the possible scheduling delays.

Optionally, one hybrid automatic repeat request process number corresponds to one or more possible scheduling delays.

Optionally, different hybrid automatic repeat request process numbers correspond to same or different possible scheduling delays.

Optionally, different hybrid automatic repeat request process numbers are grouped, and different groups of hybrid automatic repeat request process numbers correspond to different possible scheduling delays.

Optionally, the transmission module 502 is further configured to transmit the correspondence between the hybrid automatic repeat request process number and the possible scheduling delays via high signaling.

Optionally, the processing module 501 is further configured to determine the scheduling delay between the physical downlink shared channel and the physical downlink control channel in response to reaching a triggering condition.

The triggering condition includes at least one of the following conditions:

- the number of continuously scheduled hybrid automatic repeat request processes exceeds a threshold; and alternatively,
- the user equipment has a capability to configure the scheduling delay.

Optionally, the transmission module 502 is further configured to receive first signaling. The first signaling is configured to indicate that the user equipment has the capability to configure the scheduling delay; alternatively, the first signaling includes an identifier for indicating that the user equipment has the capability to configure the scheduling delay; alternatively, the first signaling is configured to indicate that the user equipment supports a preset feature; and alternatively, the first signaling includes an identifier for indicating that the user equipment supports a preset feature.

Figure 8:
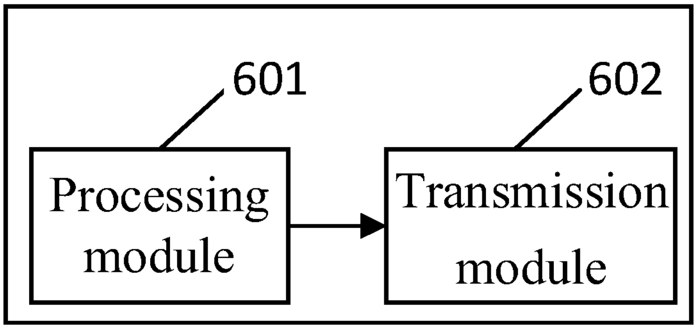
FIG. 8 is a structural schematic diagram of a resource scheduling apparatus according to an example.

FIG. 8 is a structural schematic diagram of a resource scheduling apparatus according to an example. The apparatus has a function of realizing user equipment in the above-described method example, and the function may be realized by hardware or by executing corresponding software by hardware. As shown in FIG. 8, the apparatus includes: a processing module 601 and a transmission module 602.

The processing module 601 is configured to determine a scheduling delay between a physical downlink shared channel and a physical downlink control channel. The physical downlink shared channel and the physical downlink control channel correspond to at least two different possible scheduling delays.

The transmission module 602 is configured to receive the physical downlink control channel, and to receive the physical downlink shared channel based on the scheduling delay.

Optionally, the processing module 601 is configured to determine the scheduling delay according to a correspondence between the number of unavailable subframes and the possible scheduling delays. The unavailable subframes are subframes that do not transmit a downlink channel.

Optionally, the unavailable subframes include at least one of the following:

- a switching subframe between uplink transmission and downlink transmission, and a subframe for transmitting hybrid automatic repeat request feedback.

Optionally, the processing module 601 is configured to determine the scheduling delay according to a correspondence between one hybrid automatic repeat request process number and the possible scheduling delays.

Optionally, one hybrid automatic repeat request process number corresponds to one or more possible scheduling delays.

Optionally, different hybrid automatic repeat request process numbers correspond to same or different possible scheduling delays.

Optionally, different hybrid automatic repeat request process numbers are grouped, and different groups of hybrid automatic repeat request process numbers correspond to different possible scheduling delays.

Optionally, the transmission module 602 is further configured to receive the correspondence between the hybrid automatic repeat request process number and the possible scheduling delays via high signaling.

Optionally, the processing module 601 is further configured to determine the scheduling delay between the physical downlink shared channel and the physical downlink control channel in response to determining that the triggering condition is reached.

The triggering condition includes at least one of the following conditions:

the number of continuously scheduled hybrid automatic repeat request processes exceeds a threshold; and alternatively, the user equipment has a capability to configure the scheduling delay.

Optionally, the transmission module 602 is further configured to transmit first signaling.

The first signaling is configured to indicate that the user equipment has the capability to configure the scheduling delay; alternatively, the first signaling includes an identifier for indicating that the user equipment has the capability to configure the scheduling delay; alternatively, the first signaling is configured to indicate that the user equipment supports a preset feature; and alternatively, the first signaling includes an identifier for indicating that the user equipment supports a preset feature.

Figure 9:
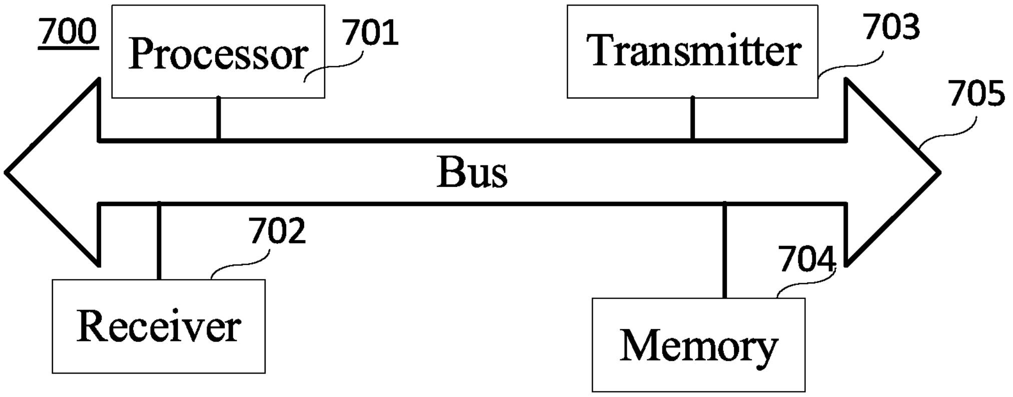
FIG. 9 is a block diagram of user equipment according to an example.

FIG. 9 is a block diagram of user equipment 700 according to an example. The user equipment 700 may include: a processor 701, a receiver 702, a transmitter 703, a memory 704 and a bus 705.

The processor 701 includes one or more processing cores. The processor 701 executes various functional applications and information processing by running a software program and a module.

The receiver 702 and the transmitter 703 may be implemented as a communication assembly. The communication assembly may be a communication chip.

The memory 704 is connected to the processor 701 by means of the bus 705.

The memory 704 may be configured to store at least one instruction. The processor 701 is configured to implement all the steps in the above-described method example by executing the at least one instruction.

In addition, the memory 704 may be realized by any type of volatile or nonvolatile memory devices or their combinations. The volatile or nonvolatile memory devices include, but are not limited to, a magnetic disk or an optical disk, an electrically erasable programmable read only memory (EEPROM), an erasable programmable read only memory (EPROM), a static random access memory (SRAM), a read only memory (ROM), a magnetic memory, a flash memory, and a programmable read only memory (PROM).

In an example, there is further provided a computer-readable storage medium. The computer-readable storage medium stores at least one instruction, at least one program, and a code set or an instruction set, and the at least one instruction, the at least one program, and the code set or instruction set are loaded and executed by the processor, to implement a downlink control channel transmission method provided in above-described various method examples.

Figure 10:
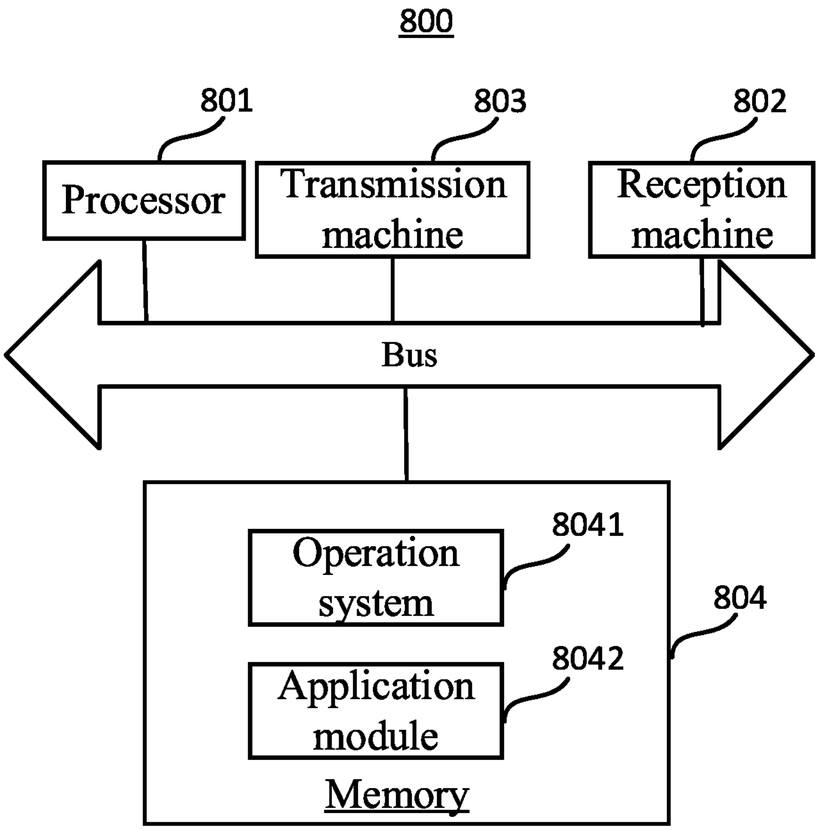
FIG. 10 is a block diagram of an access network device according to an example.

FIG. 10 is a block diagram of an access network device 800 according to an example. The access network device 800 may include: a processor 801, a reception machine 802, a transmission machine 803 and a memory 804. The reception machine 802, the transmission machine 803 and the memory 804 are connected to the processor 801 separately by means of a bus.

The processor 801 includes one or more processing cores. The processor 801 executes the method executed by the access network device in the resource scheduling method provided in the example of the disclosure by running a software program and a module. The memory 804 may be configured to store the software program and module. Specifically, the memory 804 may store an operation system 8041, and an application module 8042 required for at least one function. The reception machine 802 is configured to receive communication data transmitted from other devices. The transmission machine 803 is configured to transmit communication data to other devices.

In an example, there is further provided a computer-readable storage medium. The computer-readable storage medium stores at least one instruction, at least one program, and a code set or an instruction set, and the at least one instruction, the at least one program, and the code set or instruction set are loaded and executed by the processor, to implement the resource scheduling method provided in above-described various method examples.

An example of the disclosure further provides a resource scheduling system. The resource scheduling system includes user equipment and an access network device. The user equipment is the user equipment provided in the example as shown in FIG. 9. The access network device is the access network device provided in the example as shown in FIG. 10.

Those skilled in the art could easily conceive of other implementation solutions of the disclosure upon consideration of the description and the disclosure disclosed here. The disclosure is intended to cover any variations, uses or adaptive changes of the disclosure, which follow the general principles of the disclosure and include common general knowledge or conventional technical means that is not disclosed in the art. The description and the examples are to be regarded as merely examples, and the true scope and spirit of the disclosure are indicated by the following claims.

It should be understood that the disclosure is not limited to a precise structure which has been described above and illustrated in the accompanying drawings, and may have various modifications and changes without departing from the scope. The scope of the disclosure is limited merely by the appended claims.

In the examples of the disclosure, the access network device determines the scheduling delay between the physical downlink shared channel and the physical downlink control channel, and then the scheduling delay is used for transmitting a downlink channel. Because the scheduling delay is selected and configured from at least two different possible scheduling delays, different scheduling delays may be determined in different cases, resource scheduling is more flexible, and the resource scheduling is improved.

According to an aspect of the examples of the disclosure, there is provided a resource scheduling method. The method includes:

determining a scheduling delay between a physical downlink shared channel and a physical downlink control channel, where the physical downlink shared channel and the physical downlink control channel correspond to at least two different possible scheduling delays; and transmitting the physical downlink control channel, and transmitting the physical downlink shared channel based on the scheduling delay.

Optionally, the determining a scheduling delay between a physical downlink shared channel and a physical downlink control channel includes:

determining the scheduling delay according to a correspondence between the number of unavailable subframes and the possible scheduling delays, where the unavailable subframes are subframes that do not transmit a downlink channel.

Optionally, the unavailable subframes include at least one of the following:

a switching subframe between uplink transmission and downlink transmission, and a subframe for transmitting hybrid automatic repeat request feedback.

Optionally, the determining a scheduling delay between a physical downlink shared channel and a physical downlink control channel includes:

determining the scheduling delay according to a correspondence between one hybrid automatic repeat request process number and the possible scheduling delays.

Optionally, one hybrid automatic repeat request process number corresponds to one or more possible scheduling delays.

Optionally, different hybrid automatic repeat request process numbers correspond to same or different possible scheduling delays.

Optionally, different hybrid automatic repeat request process numbers are grouped, and different groups of hybrid automatic repeat request process numbers correspond to different possible scheduling delays.

Optionally, the method further includes:

determining the scheduling delay between the physical downlink shared channel and the physical downlink control channel in response to reaching a triggering condition, where the triggering condition includes at least one of the following conditions that the number of continuously scheduled hybrid automatic repeat request processes exceeds a threshold; or, user equipment has a capability to configure the scheduling delay.

Optionally, the method further includes:

receiving first signaling, where the first signaling is configured to indicate that the user equipment has the capability to configure the scheduling delay; or, the first signaling includes an identifier for indicating that the user equipment has the capability to configure the scheduling delay; or, the first signaling is configured to indicate that the user equipment supports a preset feature; and or, the first signaling includes an identifier for indicating that the user equipment supports a preset feature.

According to another aspect of the examples of the disclosure, there is provided a resource scheduling method. The method includes:

determining a scheduling delay between a physical downlink shared channel and a physical downlink control channel, where the physical downlink shared channel and the physical downlink control channel correspond to at least two different possible scheduling delays; and receiving the physical downlink control channel, and receiving the physical downlink shared channel based on the scheduling delay.

Optionally, the determining a scheduling delay between a physical downlink shared channel and a physical downlink control channel includes:

determining the scheduling delay according to a correspondence between the number of unavailable subframes and the possible scheduling delays, where the unavailable subframes are subframes that do not transmit a downlink channel.

Optionally, the unavailable subframes include at least one of the following:

a switching subframe between uplink transmission and downlink transmission, and a subframe for transmitting hybrid automatic repeat request feedback.

Optionally, the determining a scheduling delay between a physical downlink shared channel and a physical downlink control channel includes:

determining the scheduling delay according to a correspondence between one hybrid automatic repeat request process number and the possible scheduling delays.

Optionally, one hybrid automatic repeat request process number corresponds to one or more possible scheduling delays.

Optionally, different hybrid automatic repeat request process numbers correspond to same or different possible scheduling delays.

Optionally, different hybrid automatic repeat request process numbers are grouped, and different groups of hybrid automatic repeat request process numbers correspond to different possible scheduling delays.

Optionally, the method further includes:

determining the scheduling delay between the physical downlink shared channel and the physical downlink control channel in response to reaching a triggering condition, where the triggering condition includes at least one of the following conditions that the number of continuously scheduled hybrid automatic repeat request processes exceeds a threshold; or, user equipment has a capability to configure the scheduling delay.

Optionally, the method further includes:

transmitting first signaling, where the first signaling is configured to indicate that the user equipment has the capability to configure the scheduling delay; or, the first signaling includes an identifier for indicating that the user equipment has the capability to configure the scheduling delay; or, the first signaling is configured to indicate that the user equipment supports a preset feature; and or, the first signaling includes an identifier for indicating that the user equipment supports a preset feature.

According to another aspect of the examples of the disclosure, there is provided a resource scheduling apparatus. The apparatus includes:

a processing module configured to determine a scheduling delay between a physical downlink shared channel and a physical downlink control channel, where the physical downlink shared channel and the physical downlink control channel correspond to at least two different possible scheduling delays; and a transmission module configured to transmit the physical downlink control channel, and to transmit the physical downlink shared channel based on the scheduling delay.

According to another aspect of the examples of the disclosure, there is provided a resource scheduling apparatus. The apparatus includes:

a processing module configured to determine a scheduling delay between a physical downlink shared channel and a physical downlink control channel, where the physical downlink shared channel and the physical downlink control channel correspond to at least two different possible scheduling delays; and a transmission module configured to receive the physical downlink control channel, and to receive the physical downlink shared channel based on the scheduling delay.

According to another aspect of the examples of the disclosure, there is provided an access network device. The access network device includes: a processor, and a memory configured to store an executable instruction for the processor, where the processor is configured to implement the resource scheduling method described above by loading and executing the executable instruction.

According to another aspect of the examples of the disclosure, there is provided user equipment. The user equipment includes: a processor, and a memory configured to store an executable instruction for the processor, where the processor is configured to implement the resource scheduling method described above by loading and executing the executable instruction.

According to another aspect of the examples of the disclosure, there is provided a computer-readable storage medium, where when an instruction in the computer-readable storage medium is executed by a processor, the resource scheduling method described above may be executed.

What is claimed is:

1. A method for resource scheduling for a half-duplex frequency division duplexing (HD-FDD) machine type communication (MTC) user equipment (UE), the method comprising:

selecting, in response to reaching a triggering condition, a scheduling delay among at least two different possible scheduling delays between a physical downlink shared channel (PDSCH) and a physical downlink control channel (PDCCH) according to a correspondence between a hybrid automatic repeat request (HARQ) process number and the possible scheduling delays and a correspondence between a quantity of unavailable subframes and the possible scheduling delays, wherein the triggering condition comprises a quantity of continuously scheduled HARQ processes exceeding a threshold, and the unavailable subframes are subframes that do not transmit a downlink channel; and transmitting, after transmitting the PDCCH, the PDSCH based on the selected scheduling delay.

2. The method according to claim 1, wherein the unavailable subframes comprise at least one of:

a switching subframe between uplink transmission and downlink transmission, or a subframe for transmitting an HARQ feedback.

3. The method according to claim 1, wherein one HARQ process number corresponds to one or more possible scheduling delays; or wherein different HARQ process numbers correspond to same possible scheduling delay.

4. The method according to claim 1, wherein different HARQ process numbers are grouped, and different groups of HARQ process numbers correspond to different possible scheduling delays.

5. The method according to claim 1, wherein the triggering condition further comprises:

the HD-FDD MTC UE having a capability to configure the scheduling delay.

6. The method according to claim 5, further comprising: receiving first signaling, wherein the first signaling is configured to indicate that the HD-FDD MTC UE has the capability to configure the scheduling delay; or, the first signaling comprises an identifier for indicating that the HD-FDD MTC UE has the capability to configure the scheduling delay; or, the first signaling is configured to indicate that the HD-FDD MTC UE supports a preset feature; or, the first signaling comprises an identifier for indicating that the HD-FDD MTC UE supports the preset feature.

7. A method for resource scheduling for a half-duplex frequency division duplexing (HD-FDD) machine type communication (MTC) user equipment (UE), the method comprising:

selecting, in response to reaching a triggering condition, a scheduling delay among at least two different possible scheduling delays between a physical downlink shared channel (PDSCH) and a physical downlink control channel (PDCCH) according to a correspondence between a hybrid automatic repeat request (HARQ) process number and the possible scheduling delays and a correspondence between a quantity of unavailable subframes and the possible scheduling delays the triggering condition comprises a quantity of continuously scheduled HARQ processes exceeding a threshold, and the unavailable subframes are subframes that do not transmit a downlink channel; and receiving, after receiving the PDCCH, the PDSCH based on the selected scheduling delay.

8. The method according to claim 7, wherein the unavailable subframes comprise at least one of:

a switching subframe between uplink transmission and downlink transmission, or a subframe for transmitting an HARQ feedback.

9. The method according to claim 7, wherein one HARQ process number corresponds to one or more possible scheduling delays; or wherein different HARQ process numbers correspond to same possible scheduling delay.

10. The method according to claim 7, wherein different HARQ process numbers are grouped, and different groups of HARQ process numbers correspond to different possible scheduling delays.

11. The method according to claim 7, further comprising:

transmitting first signaling, wherein the first signaling is configured to indicate that the HD-FDD MTC UE has the capability to configure the scheduling delay; or, the first signaling comprises an identifier for indicating that the HD-FDD MTC UE has the capability to configure the scheduling delay; or, the first signaling is configured to indicate that the HD-FDD MTC UE supports a preset feature; and or, the first signaling comprises an identifier for indicating that the HD-FDD MTC UE supports the preset feature.

12. An access network device, comprising:

one or more processors, and a memory configured to store a processor-executable instruction, wherein the processor-executable instruction, when executed by the one or more processors, causes the access network device to:

select, in response to reaching a triggering condition, a scheduling delay among at least two different possible scheduling delays between a physical downlink shared channel (PDSCH) and a physical downlink control channel (PDCCH) according to a correspondence between a hybrid automatic repeat request (HARQ) process number and the possible scheduling delays and a correspondence between a quantity of unavailable subframes and the possible scheduling delays the triggering condition comprises a quantity of continuously scheduled HARQ processes exceeding a threshold, and the unavailable subframes are subframes that do not transmit a downlink channel; and transmit, after transmit the PDCCH, the PDSCH based on the selected scheduling delay.

13. User equipment, comprising:

one or more processors, and a memory configured to store a processor-executable instruction, wherein the processor-executable instruction, when executed by the one or more processors, causes the User Equipment to perform the method according to claim 7.

14. The method according to claim 1, wherein the possible scheduling delays scheduling delays that are computed in real time.

15. The method according to claim 1, wherein different HARQ process numbers correspond to different possible scheduling delays.

16. The method according to claim 1, wherein the possible scheduling delay corresponding to the HARQ process number is determined based on a presence of the unavailable subframes and a quantity of such unavailable subframes present.

17. The method according to claim 1, further comprising:

using a fixed scheduling delay as the scheduling delay between the PDSCH and the PDCCH in response to not reaching the triggering condition.

18. The method according to claim 1, wherein the correspondence between the quantity of unavailable subframes and the possible scheduling delays is determined according to a protocol, through a negotiation between the HD-FDD MTC UE and a network device, or through a configuration of the network device; and the correspondence between the HARQ process number and the possible scheduling delays is determined according to a protocol, through a negotiation between the HD-FDD MTC UE and the network device, or through a configuration of the network device.

19. The method according to claim 1, wherein the quantity of the continuously scheduled HARQ processes is an amount of scheduling information continuously transmitted from an access network device and an amount of scheduling information continuously received by the HD-FDD MTC UE.

20. The method according to claim 1, wherein the scheduling delay among the at least two different possible scheduling delays is further selected according to different channel conditions and different service types.

* * * * *